Sept. 16, 1924.
C. STOEFFLER
1,508,902
BIRD GUARD AND ANTIBLIND RATTLER
Filed June 6, 1923
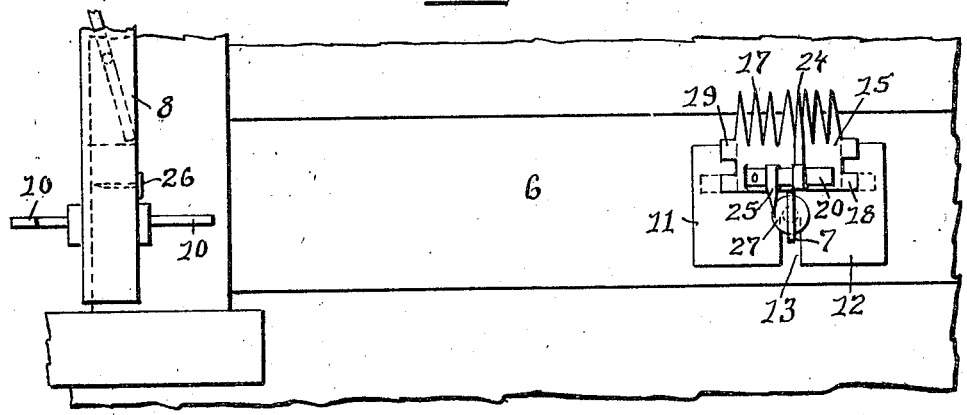
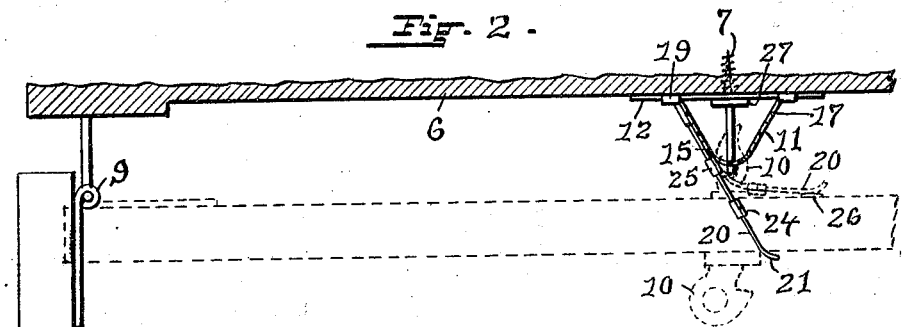
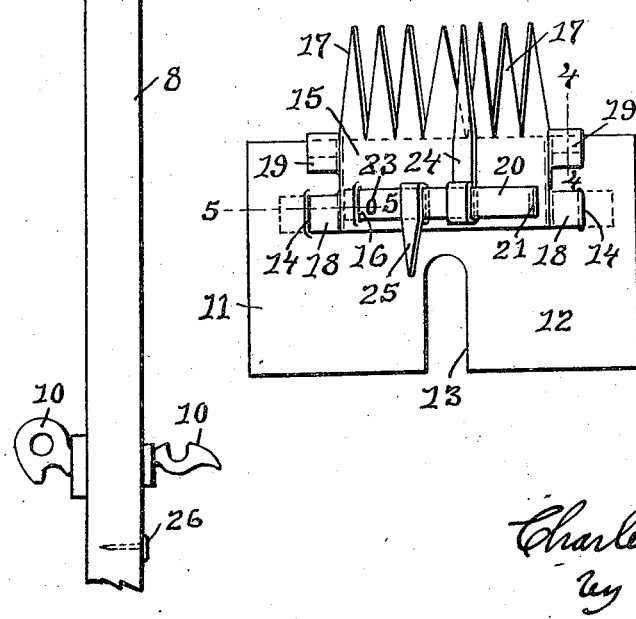
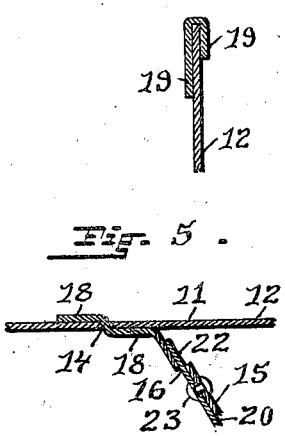
INVENTOR
Charles Stoeffler
By Chas. H. Luther
ATTORNEY Patented Sept. 16, 1924.

1,508,902

UNITED STATES PATENT OFFICE.

CHARLES STOEFFLER, OF PROVIDENCE, RHODE ISLAND.

BIRD GUARD AND ANTIBLIND RATTLER.

Application filed June 6, 1923. Serial No. 643,679.

*To all whom it may concern:*

Be it known that I, CHARLES STOEFFLER, a citizen of the United States, residing at Providence, in the county of Providence and State of Rhode Island, have invented a new and useful Improvement in Bird Guard and Antiblind Rattlers, of which the following is a specification.

My invention has reference to an improvement in bird guards for blind catches and more particularly to an improvement in a combined bird guard and antiblind rattler.

The object of my invention is to improve the construction of a bird guard and antiblind rattler whereby birds, such as English sparrows, are prevented from perching on the blind catches of blinds and the blind is prevented from rattling, by a spring arm incorporated with the bird guard, said bird guard and antiblind rattler being easily and quickly secured in place to the house by one of the members of the blind catch.

My invention consists in the peculiar and novel construction of a bird guard and antiblind rattler, said bird guard and antiblind rattler having details of construction, as will be more fully set forth hereinafter and claimed.

Figure 1 is a face view of a portion of the side of a house provided with my improved bird guard and antiblind rattler.

Figure 2 is a top plan view of Figure 1 showing a portion of the blind in a partly open position in full lines and in the closed position in broken lines.

Figure 3 is an enlarged face view of the bird guard and antiblind rattler.

Figure 4 is an enlarged detail vertical sectional view taken on line 4, 4 of Figure 3, and Figure 5 is an enlarged detail horizontal sectional view taken on line 5, 5 of Figure 3.

In the drawing 6 indicates a portion of the side of a house having the usual blind catch striker 7 and 8 a portion of a blind hinged to the house by the usual hinge 9 and having the usual blind catch 10, all of which forms no part of my present invention. 11 indicates my improved bird guard and antiblind rattler which consists of a flat sheet metal plate 12 having a central vertical slot 13 which extends from the lower edge of the plate upwards to approximately the center of the plate and two vertical side slits 14, 14, as shown in Figures 3 and 5. On the upper portion of the plate 12 and on the front is a V-shaped sheet metal member 15 having on one side a vertical slit 16 and on its upper edge a series of upwardly extending pointed members 17, 17. The V-shaped member 15 is secured to the plate 12 by fastening members 18, 18 and 19, 19, on each of its side edges. Each fastening member 18 first lies flat against the face of the plate 12, it then extends through a slit 14 and the outer end portion then lies flat against the back of the plate 12, as shown in Figure 5. Each fastening member 19 first lies flat against the face of the plate 12 and is then bent over the upper edge of the plate 12 and lies flat against the back of the plate 12, as shown in Figure 4. A horizontal spring arm 20 has an outer curved end 21, an inner end portion 22, which extends through the slit 16 and onto the back of the member 15, and is secured to the member 15 by a rivet 23. Secured to the spring arm 20 is an upwardly extending pointed member 24 and a downwardly extending pointed member 25. Secured to the blind 8, in any well known way, is a wearing plate 26, in a position to engage with the free end of the spring arm 20, as shown in Figures 1 and 2, thereby eliminating wear on the blind. The spring arm 20 and the wearing plate 26 form the antiblind rattler of the device, when the blind is closed, as shown in broken lines in Figure 2.

The blind catch striker 7 has the usual flanged portion 27, as shown in Figure 1 and is secured in place by screwing it into the side of the house. My improved bird guard and antiblind rattler is first placed in position with the plate 12 flat against the side of the house. The blind catch striker 7 is then screwed into the house through the slot 13 in the plate 12 until the flanged portion 27 on the striker bears against the face of the plate 12. The striker 7 is then tightened to its limit thereby firmly securing the device in place. In existing houses having blind catches it is only necessary to slightly loosen the blind catch striker, insert the plate 12 and tighten the striker, to firmly secure the device in place.

My improved bird guard and antiblind rattler is simple in construction, it can be manufactured at a minimum cost, birds such as sparrows are prevented from perching on the blind catch by the upwardly pointing members 17, 17. The downwardly pointing member 25 prevents birds from flying up and grasping the blind catch from the underside and the blind is held in the open position under spring tension by the spring arm 20 thereby preventing rattling of the blind.

Having thus described my invention I claim as new:—

1. The combination of a bird guard around a blind catch and an antiblind rattler in the form of a spring arm on the bird guard, for the purpose as described.

2. As a new article of manufacture, the combination of a V-shaped bird guard around a blind catch and an antiblind rattler in the form of a spring arm on the bird guard, for the purpose as described.

3. In a bird-guard and antiblind rattler, a flat plate, a V-shaped member on the plate and having a plurality of pointed members, a spring arm on the V-shaped member and means for securing the plate in place, for the purpose as described.

4. A bird guard and antiblind rattler comprising a flat plate, a V-shaped member secured to the face of the plate and having a series of upwardly extending pointed members on its upper edge, a horizontal spring arm secured to the V-shaped member and having an upwardly extending pointed member and a downwardly extending pointed member, for the purpose as described.

5. A bird guard and antiblind rattler comprising a flat plate, a V-shaped member secured to the plate and having a series of upwardly extending pointed members on its upper edge, a spring arm secured at one end to the V-shaped member and having an upwardly extending pointed member and a downwardly extending pointed member, means for securing the V-shaped guard member to the plate and a wearing plate for the spring arm and adapted to be secured to a blind, for the purpose as described.

In testimony whereof, I have signed my name to this specification.

CHARLES STOEFFLER.